No. 701,233. Patented May 27, 1902.
D. N. TRIPP.
WHEEL ATTACHMENT FOR PLOWS.
(Application filed Jan. 29, 1902.)
(No Model.)
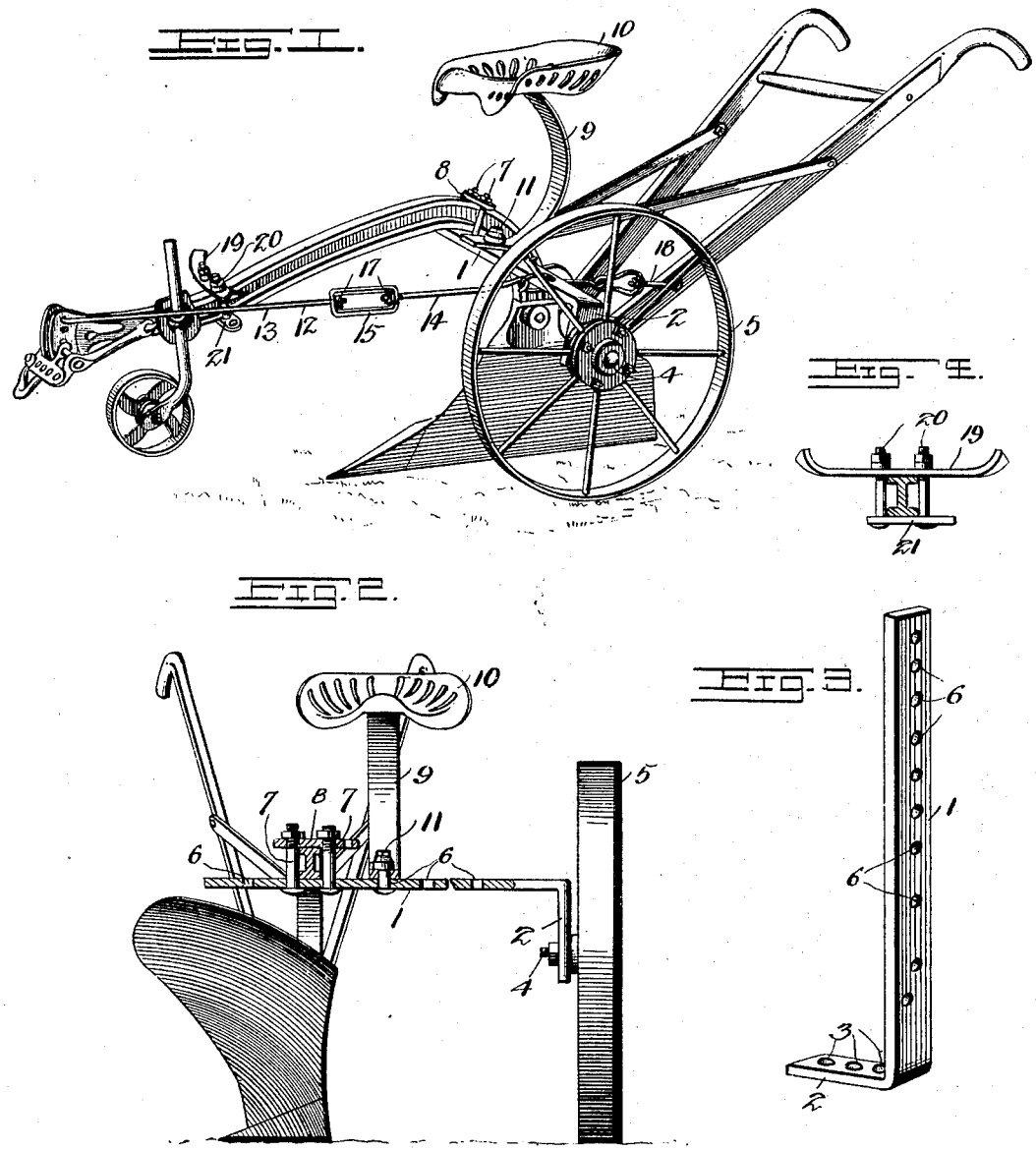

UNITED STATES PATENT OFFICE.

DARIUS N. TRIPP, OF COLDWATER, MICHIGAN, ASSIGNOR OF ONE-HALF TO JOHN N. NEAL, OF COLDWATER, MICHIGAN.

WHEEL ATTACHMENT FOR PLOWS.

SPECIFICATION forming part of Letters Patent No. 701,233, dated May 27, 1902.

Application filed January 29, 1902. Serial No. 91,795. (No model.)

*To all whom it may concern:*

Be it known that I, DARIUS N. TRIPP, a citizen of the United States, residing at Coldwater, in the county of Branch and State of Michigan, have invented a new and useful Wheel Attachment for Plows, of which the following is a specification.

My invention is an improved wheel attachment for plows by means of which an ordinary turning-plow may be readily converted into a wheel or sulky plow; and my invention consists in the peculiar construction and combination of devices hereinafter fully set forth and claimed.

In the accompanying drawings, Figure 1 is a perspective view of a plow provided with my improved wheel attachment. Fig. 2 is a transverse sectional view of the same. Fig. 3 is a detail perspective view of the cross-bar which carries the wheel. Fig. 4 is a detail view of the foot-rest, showing the same attached to the beam, the latter being indicated in cross-section.

In the embodiment of my invention I provide a cross-bar 1, which has a downturned standard 2 at one end provided with a series of openings 3, in any one of which openings may be secured a spindle 4, on which is mounted a wheel 5. Hence the said wheel may be raised and lowered with reference to the said cross-bar 1. The latter is provided with a series of openings 6 at suitable regular distances apart. The said cross-bar is in practice disposed transversely under the plow-beam at a suitable point and is secured thereto by bolts 7 and a yoke bar or plate 8. The openings 6, through certain of which said bolts 7 pass, enable the said cross-bar to be so adjusted as to dispose the wheel 5 at any desired distance from one side of the plow. It will also be understood that the said cross-bar may be so attached to the plow-beam as to dispose the said wheel 5 on either side of the plow. A bar or spring 9, which carries a seat 10, may be secured at any desired adjustment on the cross-bar 1 by a bolt 11.

A rod 12, which comprises a pair of sections 13 14 and a link 15, to which the inner ends of said sections are connected, has its front end hooked to the clevis at the front end of the beam, as shown, and its rear end hooked to a link 15, which is secured to the cross-bar 1 at a suitable distance from the outer end thereof. The sections of the said rod 12 pass through the ends of the link 15 and are provided with adjusting - nuts 17, that are screwed thereon, and by turning the said adjusting-nuts the said rod 12 may be lengthened or shortened, as may be required to dispose the cross-bar 1 at the appropriate angle to the beam and maintain the said cross-bar when adjusted. A similar rod 18 connects said cross-bar either to one of the plow-handles, as here shown, or to any other appropriate portion of the plow in rear of the said cross-bar. The said rods 12 18 are stay-rods, as will be understood. I further provide a foot-rest 19, which is disposed transversely on the plow-beam, at a suitable distance from the front end thereof, and is secured on the said plow-beam by bolts 20 and a yoke bar or plate 21, the latter being disposed on the under side of the plow-beam, as shown in Fig. 4.

My improved wheel attachment holds the plow level when in operation and prevents side draft. The plowman may either walk or ride, as he prefers. My improved attachment is exceedingly simple and cheap, may be readily manufactured, is very easily attached to and detached from a plow, and besides reducing the labor of the plowman materially lessens the draft and reduces the labor of the team. In a practical test to which my improved plow attachment has been subjected I employed the same in connection with a plow with entire success in plowing about five hundred acres of land.

Having thus described my invention, I claim—

A wheel attachment for plows, comprising a cross-bar having a fixed standard at one end, means to detachably and adjustably connect the cross-bar to a plow-beam, a wheel, a bearing-spindle therefor, attached to and vertically adjustable on the fixed standard, and stay-rods attached to the cross-bar and adapted to be attached to the plow at points in advance and rear of the cross-bar, said stay-rods including means for lengthening and shortening them, substantially as described.

In testimony that I claim the foregoing as my own I have hereto affixed my signature in the presence of two witnesses.

DARIUS N. TRIPP.

Witnesses:
J. H. D. WARREN,
R. C. SAWDEY.